(No Model.) 3 Sheets—Sheet 1.
A. H. EMERY.
HOLDER FOR TESTING MACHINES.
No. 308,659. Patented Dec. 2, 1884.
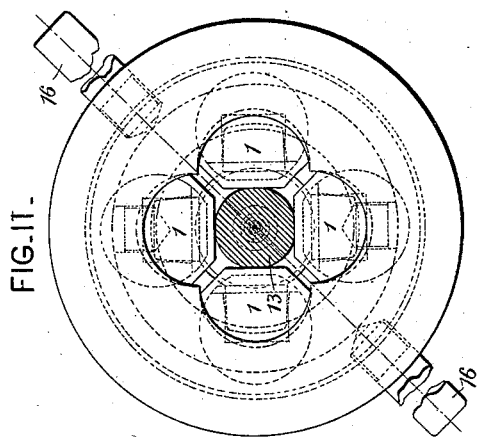
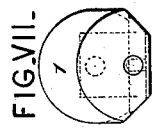
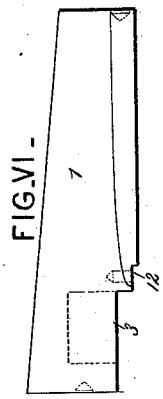
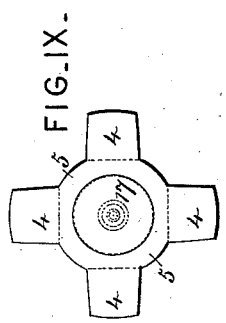
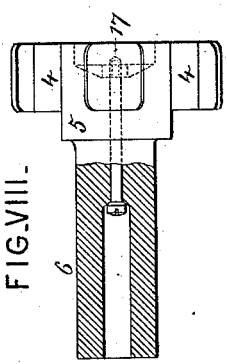
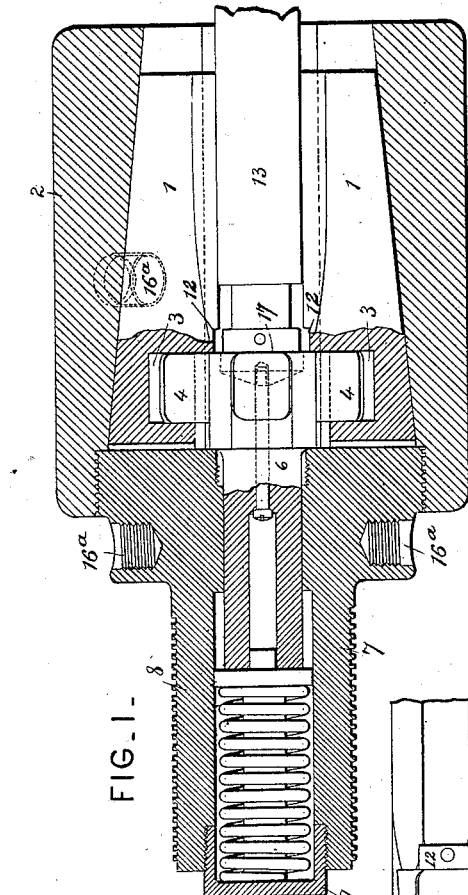
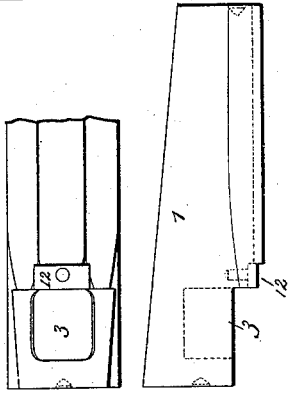
ATTEST-
Geo. T. Smallwood,
D. W. Hopkins.
INVENTOR-
Albert H. Emery
By Knight Bros.
attys.

(No Model.) 3 Sheets—Sheet 2.
A. H. EMERY.
HOLDER FOR TESTING MACHINES.
No. 308,659. Patented Dec. 2, 1884.
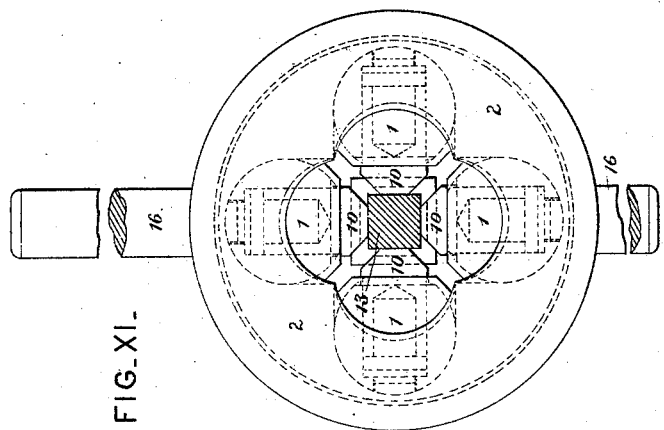
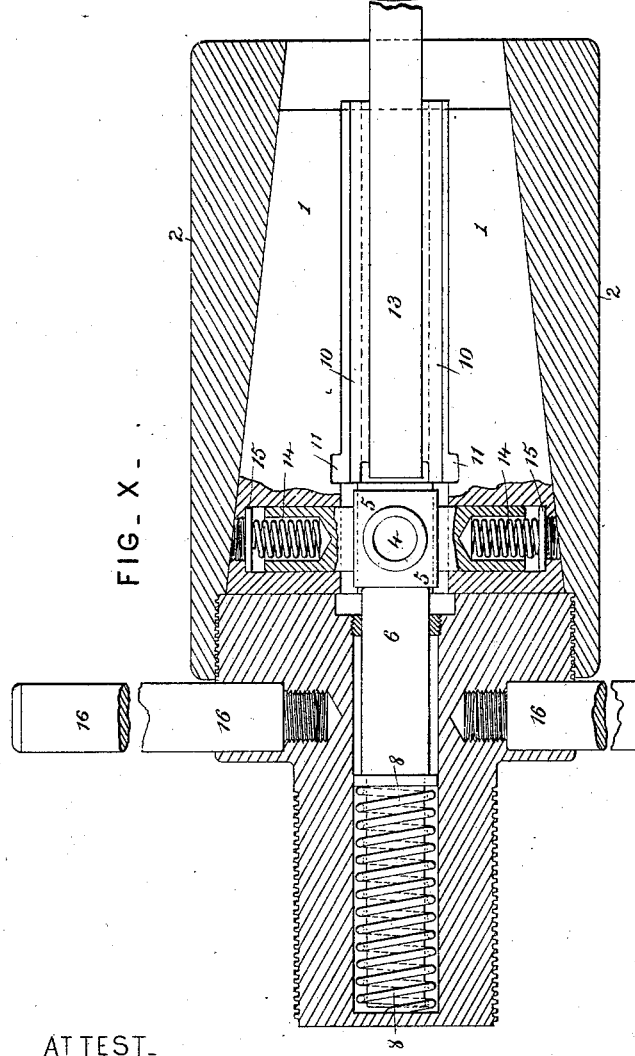
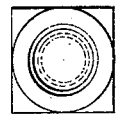
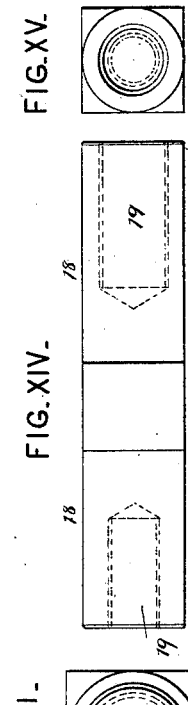
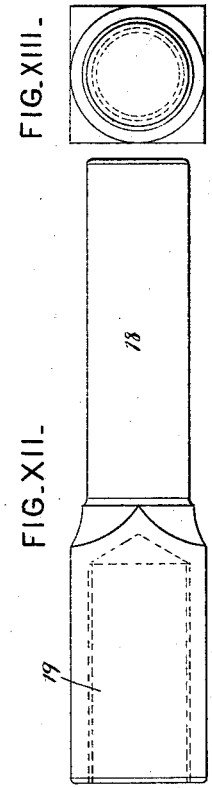
ATTEST:
Geo. T. Smallwood
L. Lumpkin
INVENTOR:
Albert H. Emery
By Knight Bros.
Att'ys (No Model.) 3 Sheets—Sheet 3.
A. H. EMERY.
HOLDER FOR TESTING MACHINES.
No. 308,659. Patented Dec. 2, 1884.
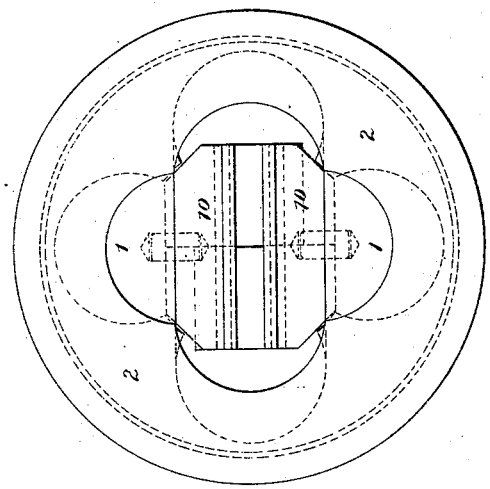
FIG. XVII.
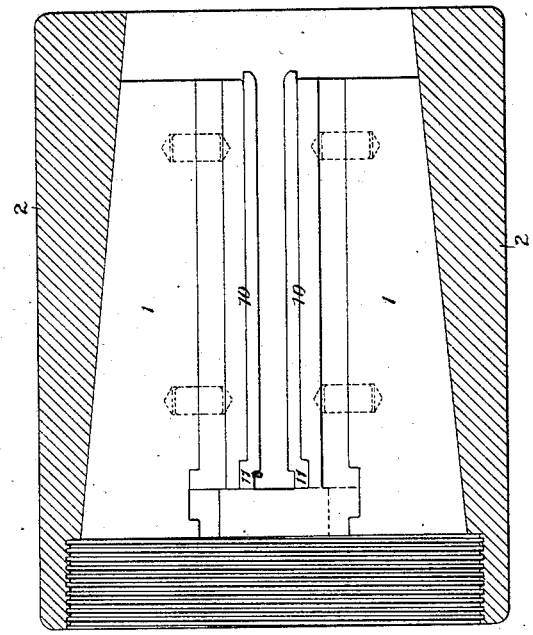
FIG. XVI.
ATTEST-
Geo. T. Smallwood.
INVENTOR -
Albert H. Emery
By Knight Bros.
attys.

United States Patent Office.

ALBERT HAMILTON EMERY, OF STAMFORD, CONNECTICUT, ASSIGNOR TO THE EMERY SCALE COMPANY, OF SAME PLACE.

HOLDER FOR TESTING-MACHINES.

SPECIFICATION forming part of Letters Patent No. 308,659, dated December 2, 1884.

Application filed February 7, 1884. (No model.)

*To all whom it may concern:*

Be it known that I, ALBERT HAMILTON EMERY, a citizen of the United States, formerly of New York, now residing at Stamford, in the county of Fairfield and State of Connecticut, have invented certain new and useful Improvements in Holders for Testing-Machines, of which the following is a specification.

The subject of my invention is a holder constructed with two or more wedges formed with cylindrical backs and sliding within a sleeve, the seats within which the wedges slide being formed to fit their backs, and converging forward in such a manner that the draft on the wedges in applying a strain will cause them to tightly grip the specimen. The sleeve thus constructed is adapted to be screwed or otherwise attached to the piston-rod, draw-head, or other suitable part of the testing-machine. The cylindrical form of the backs of the wedges adapts them to rotate in their seats, as may be necessary, to automatically adjust themselves with uniform pressure on the specimen, and toward the base or rear of the sleeve, where the seats are deepest, they embrace more than one hundred and eighty degrees of the circumference of the wedges, so as to confine them within their seats. To compel the uniform movement of the wedges, a stem is provided with a head engaging in recesses in the inner faces of the wedges near their heels or rear ends; and the said stem is itself guided in the axis of the holder. Springs are provided within the arms of the guiding-stem to press the wedges radially outward in their seats, and a strong spring is employed in the axis of the holder to force the stem and wedges forward to apply an initial gripping-pressure to the specimen. Supplemental holding-stems are provided for specimens of small size, said supplemental stems being adapted to be gripped by the holder, and having threaded sockets to receive the threaded end of the specimen. Bushings are, furthermore, provided to adapt the wedges to grip specimens of various sizes, and of round, square, flat, or irregular shape, as may be required.

In the accompanying drawings, Figure I is a longitudinal section of the improved holder in its preferred form. Fig. II is an end view of the same. Fig. III is a partial face view of a concave-faced wedge adapted for cylindrical specimens. Fig. IV is a side view of the same. Fig. V is an end view thereof. Fig. VI is a side view of a flat-faced wedge. Fig. VII is an end view thereof. Fig. VIII is a side view, partly in section, of the guiding-stem. Fig. IX is a front view thereof. Fig. X is a longitudinal section of the improved holder, illustrating slight modifications, and showing a square specimen in position. Fig. XI is an end view of the same. Fig. XII is a side view of a supplemental stem adapted to be gripped by the holder, and showing in dotted lines a screw-socket to receive a specimen. Fig. XIII is an end view of the same. Fig. XIV is a side view of a double-ended stem, showing by dotted lines screw-sockets of different sizes. Fig. XV is an end view thereof. Fig. XVI is a longitudinal section of the sleeve of the holder without the attaching shank and stem, showing bushings or clamps for holding flat specimens. Fig. XVII is an end view of the same.

The wedges 1 1 are formed with cylindrical backs fitted to slide longitudinally within corresponding seats in the sleeve 2 of the holder, the backs of the said seats converging forward, as shown by full lines in Fig. I, and indicated by dotted lines in Fig. II, so that while the faces of the wedges are at all times parallel, their forward movement within their seats will cause their faces to approach one another.

To compel the uniform and simultaneous movement of the wedges without interfering with their radial motion to and from each other, they are provided with radial recesses 3 near their heels, to receive radial arms 4 of a stem, 6, which is fitted and guided axially within the attaching-shank 7 of the holder, to which shank the sleeve 2 is secured. The head 5 of the stem is furthermore guided by its cylindrical shoulders within the sleeve 2 by contact with the glands or salient surfaces between the seats of the wedges. One or more springs, 8, of considerable power are inserted within the cavity of the shank 7 in the rear of the stem 6, and confined by a cap, 9, so as to press the stem 6 forward, and with it the wedges, causing them to apply initial pressure to a specimen introduced between them. For the introduction of the specimen the wedges are first forced back by hand, or by any suitable means. A square head or plate and transverse grooves or notches in the wedges may be substituted for the cruciform head 5 4 and the radial recesses 3, which receive the arms thereof. The faces of the wedges are made concave, as shown in Figs. IV and V, for cylindrical specimens; or flat, as in Figs. VI, VII, X, and XI, for square specimens. To adapt them to grasp specimens of smaller size, I employ bushings 10, of suitable shape and thickness, as illustrated in Figs. X, XI, XVI, and XVII. These bushings are formed with shoulders 11 at their heels, fitting in recesses 12, provided in the wedges to receive them, as shown in Figs. I, III, IV, VI, and XVI. A specimen of square section is shown at 13 in Figs. X and XI. The bushings 10, represented in Figs. XVI and XVII, are adapted to receive a flat specimen. For this purpose a single pair of wedges only is required—such as described and claimed in my application No. 120,076, of even date herewith. The form of the seats and wedges represented in Figs. I, II, IV, and VI will cause the said wedges to be confined within their seats as they move to and fro by reason of the seats extending around more than one hundred and eighty degrees of the circumference of the wedges through a considerable part of their entire length from end to end. A further means of holding the wedges tightly against the backs of their seats is illustrated in Fig. X in the form of radial springs 14, occupying sockets in the arms 4 of the guiding-stem, and pressing outward against the faces of screws or washers 15 in the ends of the sockets in the wedges in which the arms 4 fit. Handles 16 are screwed radially into sockets 16ª in the head of the shank 7, and in the sleeve for carrying the holder and securing it into its place in the draw-head, piston-rod, or other part of the testing-machine.

In order to receive the impact of recoil caused by the breaking of a specimen a hardened steel anvil, 17, is fitted in the center of the head 5 of the guiding-stem.

In order to receive specimens which are too small or too short for convenient application to the holder or the bushings therein, supplemental stems are provided, as illustrated in Figs. XII to XV, inclusive, formed, as at 18, to be gripped by the wedges, and provided with one or more screw-sockets, 19, of suitable size to receive the end of a specimen, which is correspondingly threaded and screwed therein.

Having thus described my invention, the following is what I claim as new therein and desire to secure by Letters Patent:

1. A holder for testing-machines, constructed with a stem screwed into a sleeve or case containing wedges formed and arranged to be tightened on the specimen by the strain applied thereto.

2. A holder for testing-machines, constructed with holding-wedges having backs cylindrical, or nearly so, and a sleeve formed with corresponding seats therefor, having converging axes.

3. A holder for testing-machines, constructed with two or more wedges having backs cylindrical, or nearly so, so as to be self-adjusting, and gripping the specimen by movement in their seats produced by the strain on the specimen.

4. A holder for testing-machines, constructed with sliding wedges, and a stem having a head extending into mortises or recesses in the several wedges, so as to compel them to move in unison, substantially as described.

5. In combination with two or more sliding wedges, a stem having a projecting head extending into the wedges, and a guiding-body compelling it to move in line with the axis of the holder.

6. The guiding-stem with arms projecting into the wedges, and guiding-shoulders fitting corresponding bearings within the sleeve to retain the stem in the axis of the holder.

7. The combination of sliding wedges, a guiding-stem engaging therewith, and springs which force the wedges out against their seats, substantially as set forth.

8. In combination with the holding-wedges and guiding-stem, a hardened-steel anvil to sustain the recoil impact of the specimen.

9. A holder for testing-machines, having sliding wedges forced forward by a spring-applying initial and continuous pressure in the direction in which the strain is to be applied.

10. The combination of the sliding wedges, guiding-stem, and a spring for forcing the wedges forward, as explained.

ALBERT H. EMERY.

Witnesses:
OCTAVIUS KNIGHT,
HARRY E. KNIGHT.